(12) United States Patent
Buckley

(10) Patent No.: US 7,283,830 B2
(45) Date of Patent: Oct. 16, 2007

(54) WIRELESS DEVICE HUB SYSTEM AND METHOD

(75) Inventor: David J. Buckley, Jumal, CA (US)

(73) Assignee: Motricity, Inc., Durham, NC (US)

( * ) Notice: Subject to any disclaimer, the term of this patent is extended or adjusted under 35 U.S.C. 154(b) by 613 days.

(21) Appl. No.: 10/351,078

(22) Filed: Jan. 23, 2003

(65) Prior Publication Data

US 2003/0139193 A1    Jul. 24, 2003

Related U.S. Application Data

(60) Provisional application No. 60/418,895, filed on Oct. 15, 2002, provisional application No. 60/353,012, filed on Jan. 29, 2002.

(51) Int. Cl.
 *H04Q 7/20* (2006.01)
(52) U.S. Cl. ............... 455/466; 455/412.1; 455/412.2; 455/412.3
(58) Field of Classification Search ........ 455/415–417, 455/412.1–414.4, 466
See application file for complete search history.

(56) References Cited

U.S. PATENT DOCUMENTS

| 5,699,407 | A  | * | 12/1997 | Nguyen ................... 455/462 |
| 6,785,561 | B1 | * | 8/2004  | Kim ........................ 455/566 |
| 6,908,389 | B1 | * | 6/2005  | Puskala ................... 463/40 |
| 2001/0043599 | A1 | * | 11/2001 | Redmond ................ 370/390 |
| 2001/0047272 | A1 | * | 11/2001 | Frietas et al. ............ 705/1 |
| 2002/0049074 | A1 | * | 4/2002  | Eisinger et al. .......... 455/552 |
| 2004/0237109 | A1 | * | 11/2004 | Laitinen et al. .......... 725/62 |
| 2005/0064887 | A1 | * | 3/2005  | Bengtsson et al. ...... 455/466 |
| 2005/0076100 | A1 | * | 4/2005  | Armstrong .............. 709/219 |

* cited by examiner

*Primary Examiner*—Duc M. Nguyen
*Assistant Examiner*—Justin Lee
(74) *Attorney, Agent, or Firm*—Womble Carlyle Sandridge & Rice, PLLC

(57) ABSTRACT

A system and method for transferring a data file to a wireless device where the system generates a Short Message Service ("SMS") message including a URL address at which the data file is stored and transmits the SMS message to the wireless device.

12 Claims, 7 Drawing Sheets

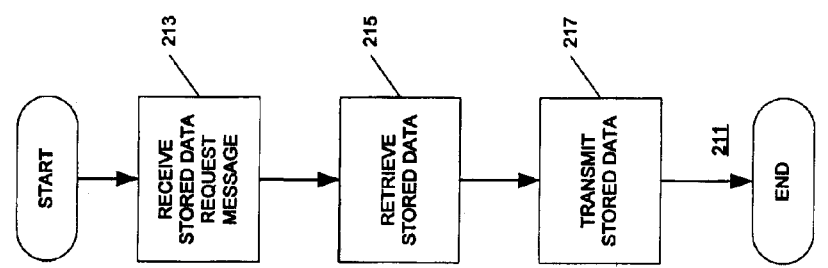
FIG. 5D
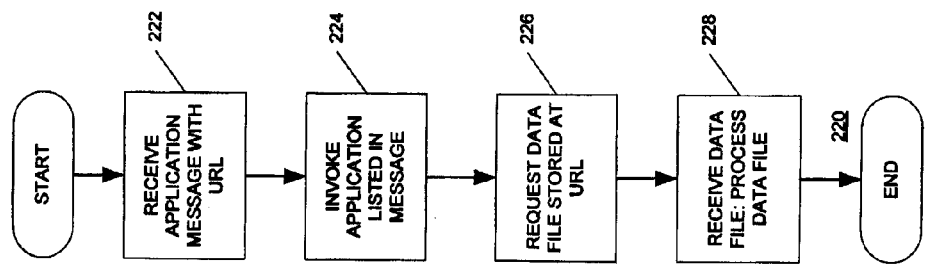
FIG. 5C
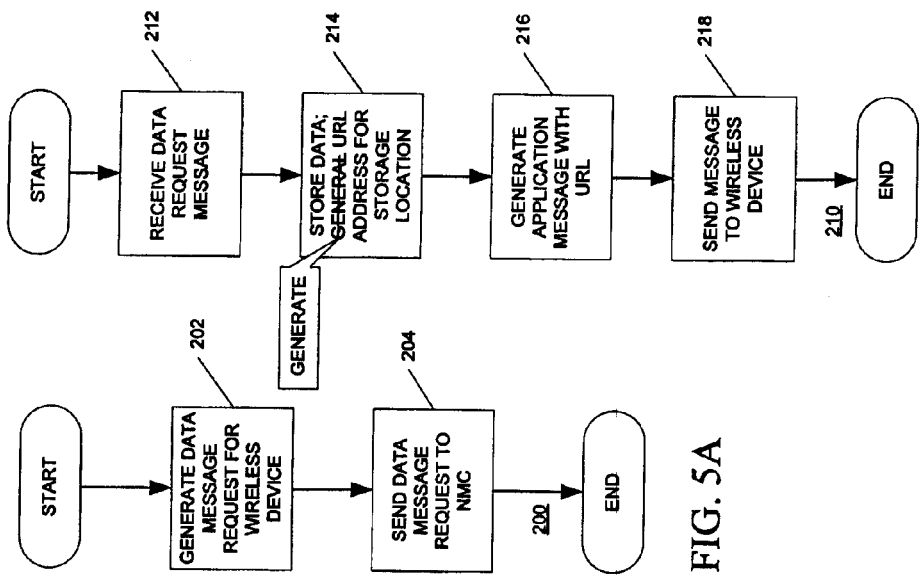
FIG. 5B
FIG. 5A

WIRELESS DEVICE HUB SYSTEM AND METHOD

CROSS REFERENCE TO RELATED APPLICATIONS

This invention is related to Provisional Patent Application 60/418,895, filed Oct. 15, 2002, and entitled "Wireless Device Hub System and Method" and Provisional Patent Application 60/353,012, filed Jan. 29, 2002, and entitled "On Demand Wireless Multimedia System and Method", which are hereby incorporated by reference for their teachings.

BACKGROUND OF THE INVENTION

1. Field of the Invention

This invention relates to a system and method for providing a network hub for wireless devices, in particular for enabling data communications between wireless devices.

2. Description of Related Art

It is desirable to send a data file to a wireless device from another wireless device or data processing system where the data file may represent a digital image, sound, program instructions, ring tone, or other digital data. A need exists for a system or method to enable such a transfer regardless of the wireless device's operating system or its wireless service provider/connection.

SUMMARY OF THE INVENTION

The present invention includes a method, apparatus, and system for transferring a data file to a wireless device. The system generates a Short Message Service ("SMS") message including a URL address at which the data file is stored and transmits the SMS message to the wireless device. The SMS message may also include an application identifier. In one embodiment the application identifier indicates an application to be invoked by the wireless device upon receipt of the SMS message. In another embodiment, the wireless device is a cellular phone and the wireless device may have a BREW operating system.

The system may further receive a request message from the wireless device requesting the stored data file. The system may then generate a responsive message including the stored data file for the wireless device and transmit the responsive message to the wireless device.

The present invention also includes a method, apparatus, and system for transferring data files to wireless devices. The system receives a SMS message including a data file and at least one wireless device identifier, the message requesting that the data file be transmitted to a wireless device corresponding to the identifier. The system stores the data file and creates a URL address corresponding to the stored data file. The system also generates a SMS message including the URL address and transmits the SMS message to the wireless device.

The present invention is also a method of transferring a data file from an electronic device to a wireless device via a hub. In this invention the electronic device may generate a data transmit request message including the data file and an identifier corresponding to the wireless device and send the data transmit request message to the hub. The hub may receive the data transmit request message and store the data file. The hub may further create a URL address corresponding to the stored data file, generate a SMS data waiting message including the URL address, and transmit the SMS data waiting message to the wireless device. The wireless device may receive the SMS data waiting message. The wireless device may also invoke an application identified by an application identifier.

The wireless device may also generate a SMS request data message requesting the stored data file and transmit the SMS request data message to the hub. The hub may also receive the SMS request data message from the wireless device, generate a SMS data transmit message including the stored data file, and transmit the SMS data transmit message to the wireless device.

BRIEF DESCRIPTION OF THE DRAWINGS

FIGS. 5A to 5D are flow diagrams of exemplary methods for sending a data message to a wireless device according to an embodiment of the present invention.

Like reference numbers and designations in the various drawings indicate like elements.

DETAILED DESCRIPTION OF THE PREFERRED EMBODIMENTS

Throughout this description, the preferred embodiment and examples shown should be considered as exemplars, rather than as limitations on the present invention.

Figure 1:
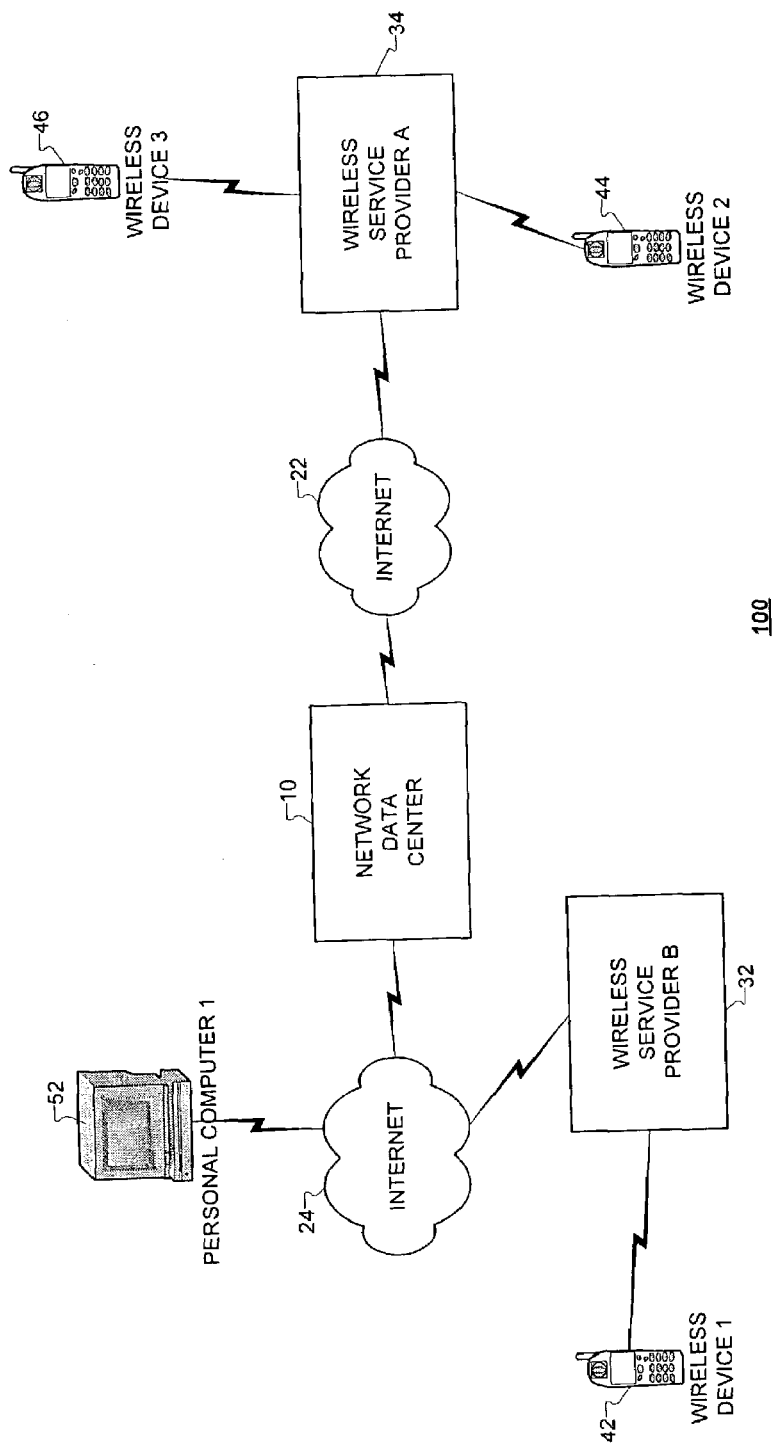
FIG. 1 is a diagram of an embodiment of wireless device communication architecture in accordance with the present invention.

FIG. 1 is a diagram of an embodiment of a wireless device communication architecture 100 in which the present invention may be employed. The exemplary architecture 100 includes a network data center, network management center ("NMC") or communications hub 10, wireless service providers A, B 32, 34, wireless devices 42, 44, 46, and personal computer 52. In the exemplary architecture 100, the wireless service provider B 32 and personal computer 52 are coupled to the hub 10 via a first network of networks or Internet 24. The wireless service provider A 34 is coupled to the hub 10 via a second network of networks or Internet 22. In another embodiment, Internet 24 and Internet 22 may be coupled/interconnected. Wireless device 1 (42) is wirelessly coupled to provider B 32 and Wireless device 2 (44) and device 3 (46) are wirelessly coupled to provider A 34. In another exemplary embodiment, there may be a single wireless service provider.

In one embodiment, the hub 10 enables a user via a computer (52) or a first wireless device (42, 44, 46) to communicate messages including digital data to a second wireless device (42, 44, 46) regardless of the second wireless device's operating system or service provider (32, 34).

Figure 2:
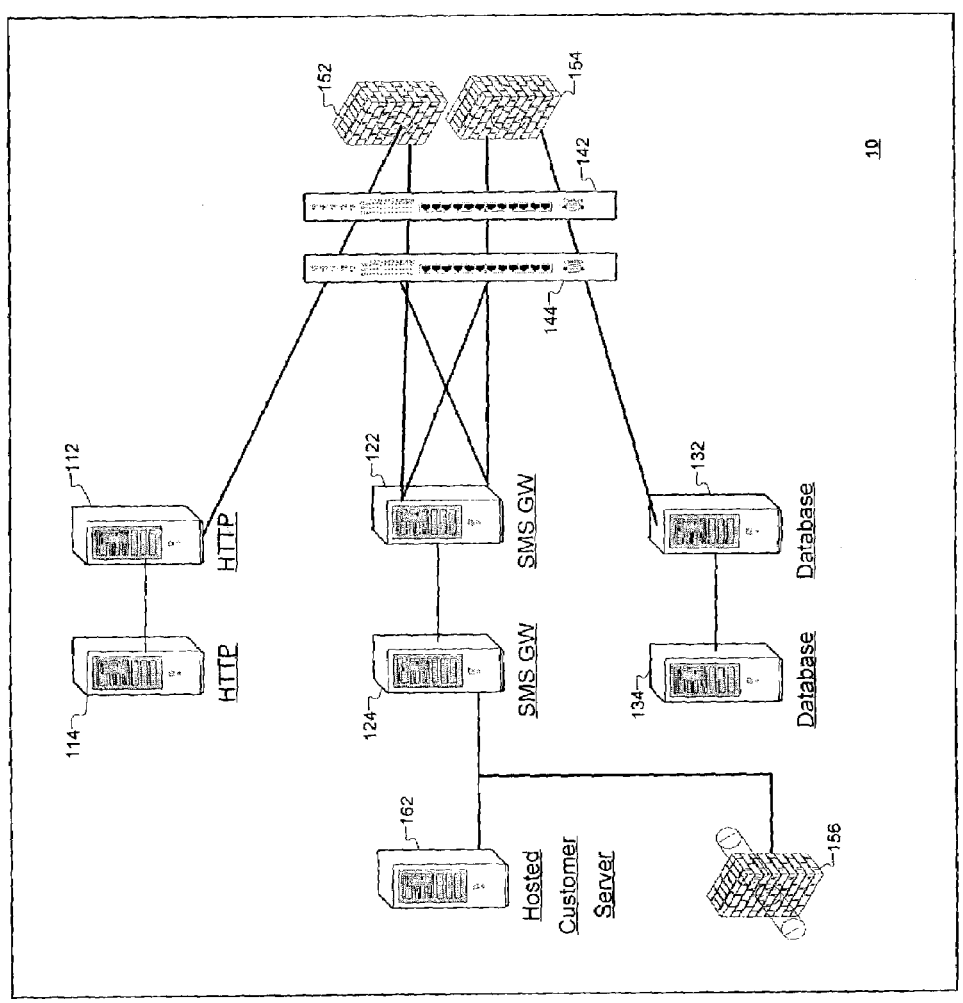
FIG. 2 is a diagram of an embodiment of a wireless device hub in accordance with the present invention.

FIG. 2 is a diagram of an embodiment of a network data center or hub 10 in accordance with the present invention. The hub 10 includes one or more Hyper Text Transfer Protocol ("HTTP") based servers 112, 114, Short Message Service ("SMS") Gateways ("GW") 122, 124, Hosted Customer Server 162, database or file servers 132, 134, Routers 142, 144, and firewalls 152, 154, and 156. The HTTP servers 112, 114 communicate internet protocol ("IP") messages with Internet 22, 24. The SMS GW 122, 124 communicate SMS messages with wireless service providers 32, 34 via the routers 144, 142, and firewalls 152, 154. Database servers 132, 134 store messages and other wireless data related information. Hosted customer server 162 coordinates the operation and ability of SMS GW 122, 124 to communicate with service providers 32, 34.

Figure 3:
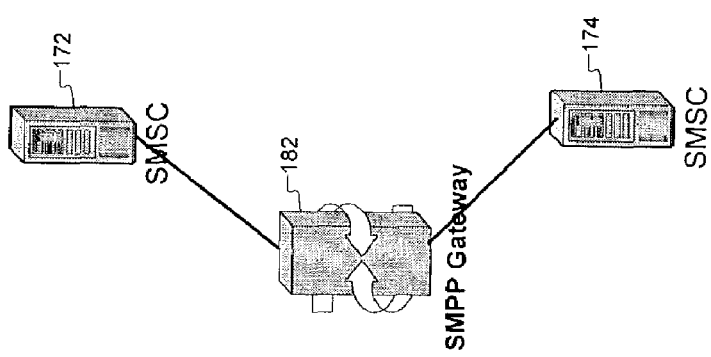
FIG. 3 is a diagram of an embodiment of a wireless service provider system in accordance with the present invention.

FIG. 3 is a diagram of an exemplary wireless service provider system 32, 34. The system 32, 34 includes a Short Message Peer To Peer "SMPP" gateway server 182 coupled to Short Message Service Centers ("SMSC") 172, 174. The SMPP server 182 is coupled to the hub 10 via a network (22, 24) and wireless device 42, 44, 46 by an interface (not shown). The wireless device 42, 44, 46 may be a cellular based telephone (cellphone), personal data assistant ("PDA") with wireless modem, or other wireless device. The service provider interface may be a base station and network in one embodiment.

Figure 4:
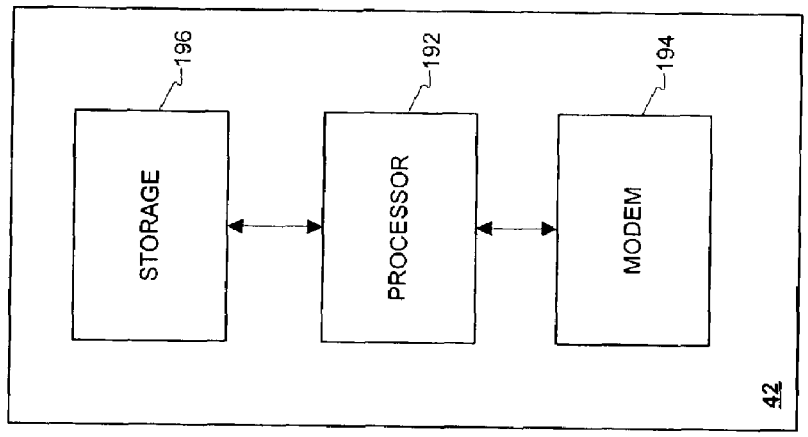
FIG. 4 is a diagram of an embodiment of a data system that be employed in the architecture of FIG. 1.

FIG. 4 is a diagram of a segment of an exemplary wireless device or personal computer 52. The device 42 includes a central processing unit ("CPU") or processor 192, modulator/demodulator ("MODEM") 194, and storage/memory 196. The storage 196 may be any electronic storage including random access memory ("RAM") and hard drive (magnetic, optical). The device 110 generates its request and sends it wirelessly to the server system 40 via the communication channel 120. The MODEM 194 may communicate with the wireless service provider 32 via an analog or digital cellular link, satellite, local net wireless link, such as Bluetooth or Airport, and other wireless networks such as Palm® net.

The architecture 100 may be employed to perform several exemplary methods in accordance with the present invention. In one embodiment architecture 100 is employed to send digital data messages to wireless devices. FIGS. 5A to 5D are flow diagrams of exemplary methods 200, 210, 220, and 211, according to the present invention for delivering a data file to a wireless device 42, 44, or 46. In process 200, a user via a personal computer, PDA, wireless device, or other electronic device (capable of sending a digital data message) desires to a send a digital data file to a wireless device 42, 44, and 46. In one embodiment, the user via a personal computer, PDA, wireless device, or other electronic device may couple with the hub 10 (such as via a network 22, 24). Further, the destination wireless device 42, 44, 46 may couple to a wireless service provider where the service provider (32, 34) may also couple to the hub 10.

In this embodiment, a user commands the sending electronic device to generate a data message request via an electronic device at step 202. The data message request includes the digital data to be transferred to a wireless device (destination wireless device) and the destination wireless device's identifier. In one example, the sending electronic device is a first cellular telephone having a phone number A. The destination wireless device is a second cellular telephone having a phone number B. The digital data is an encoded digital picture, such as a Joint Photographic Experts Group "JPEG" format data. The first cellular telephone and the second cellular telephone may or may not have the same wireless service provider.

Accordingly, the destination wireless device's identifier is the second cellular telephone's number. In this example, the first cellular telephone (sending device) generates a request to transmit the data to the second cellular telephone (destination device) and transmits this request to the NMC or hub (at step 204) via the first cellular telephone's (sending device's) service provider. In one exemplary embodiment, the first cellular telephone (sending device) includes a program that generates a HTTP based message directed to an IP address of the HTTP servers 112, 114. The program is executed by the operating system of the sending device. In one exemplary embodiment the first cellular telephone's (sending device's) operating system is Binary Runtime Environment for Wireless ("BREW®"), an operating system developed and provided by Qualcomm®. The first cellular telephone's (sending device's) service provider transfers the data message request to the NMC or hub 10 via a network (such as 22, 24) coupling the service provider to the NMC 10. In another embodiment, the sending device may be a personal computer. The personal computer may link to a web page that enables a user to generate a request to transmit a data message to a wireless device where the request is transmitted to the NMC or hub 10. The personal computer may be coupled to the NMC 10 via a network 22, 24.

In an exemplary embodiment, the NMC or hub 10 performs the processes 210 and 211 shown in FIGS. 5B and 5D. Processes 210 and 211 are exemplary methods for enabling communication of data received in a data message request to the destination wireless device. In process 210 (FIG. 5B), a NMC or hub 10 receives a data request message (step 212) at a HTTP server 112, 114. The data message request includes the digital data and the destination wireless device's identifier. The NMC or hub 10 stores the data at a database server 132, 134, and generates a uniform resource locator ("URL") address for the data within the database server 132, 134 (step 214). The NMC or hub executing process 210 then generates a data available SMS message to be transmitted to the destination wireless device where the data available SMS message indicates that data stored at a URL is available for the destination wireless device (step 216).

The NMC or hub 10 may format the SMS message based on the destination wireless device's identifier. In one embodiment, the NMC or hub 10 may determine the wireless device's operating system based on its identifier. When the NMC or hub 10 determines that the destination wireless device has a BREW operation system (for example), the data available message may have the format:

//BREW:Classid:URL.

The classid is a BREW application identifier with which the application will perform the process 220 shown in FIG. 5C. The NMC or hub 10 transmits the data available SMS message to the (destination) wireless device via its wireless service provider. The NMC or hub 10 may use the SMS GW 122, 124, routers 142, 144, and firewall 152, 154 to transmit the data available SMS message to the wireless service provider (via network 22, 24).

The destination wireless device's operating system performs the process 220 and receives the data available SMS message at step 222. In one exemplary embodiment the destination device's operating system is BREW and the data available SMS message includes the classid and URL. The process 220 invokes an application based on the classid at step 224. The invoked application generates a data request SMS message to the NMC or HUB based on the URL (at step 226.) The NMC or hub 10 executes process 211, in particular: receiving the data request message from the application, retrieving the data stored in a database server 132, 134 based on the URL in the data request message, and transmitting the data to the destination wireless device (steps 213, 215, and 217 of FIG. 5D) using HTTP. The invoked application (of the destination wireless device) then receives the data message and processes the data file (step 228). For example when the data message file represents a picture the invoked application may convert the data message file into a picture displayed on a screen (not shown) of the destination wireless device.

Figure 6C:
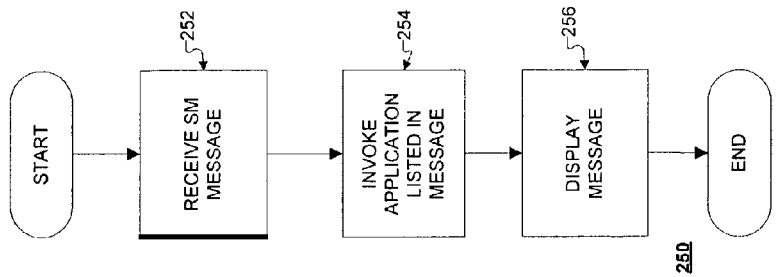
FIGS. 6A to 6C are flow diagrams of exemplary methods for sending a short message to at least one wireless device according to an embodiment of the present invention.
Figure 6B:
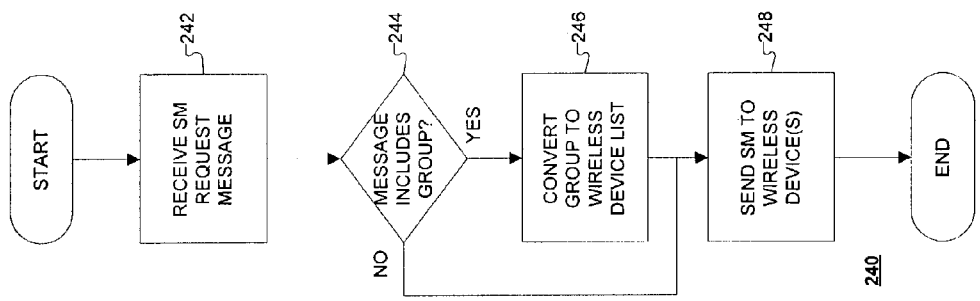
Figure 6A:
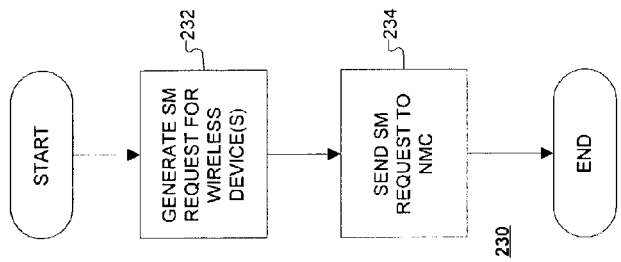
Figure 7D:
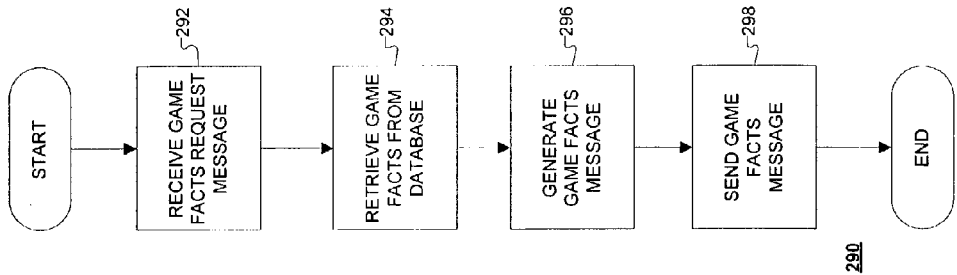
FIGS. 7A to 7D are flow diagrams of exemplary methods for maintaining and communicating a wireless device game score database according to an embodiment of the present invention.
Figure 7C:
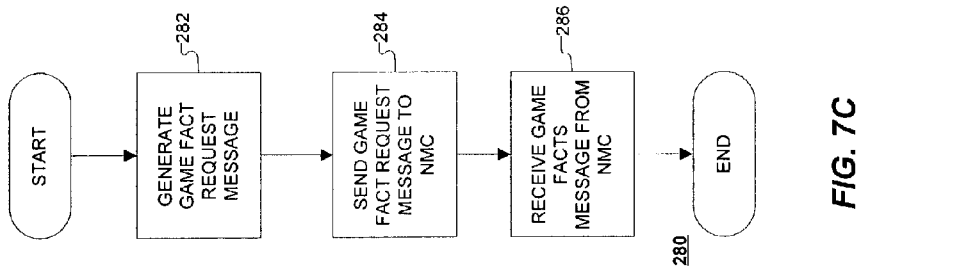
Figure 7B:
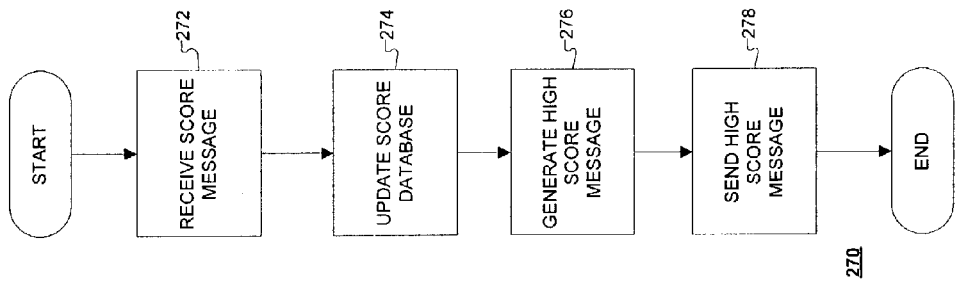
Figure 7A:
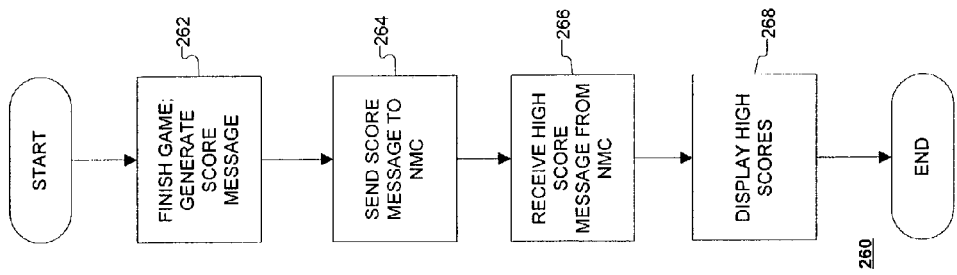
Figure 8D:
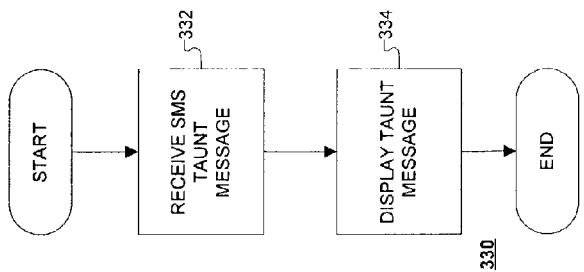
FIGS. 8A to 8D are flow diagrams of exemplary methods for a wireless device user to send messages to other users contemporaneously executing a similar application according to an embodiment of the present invention.
Figure 8C:
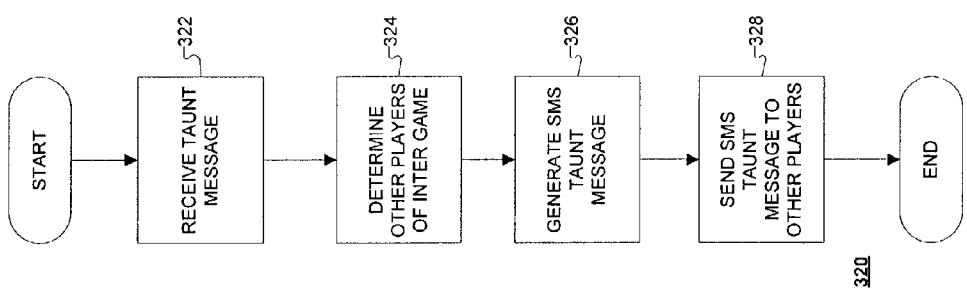
Figure 8B:
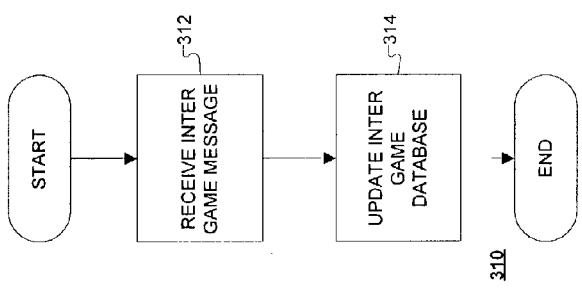
Figure 8A:
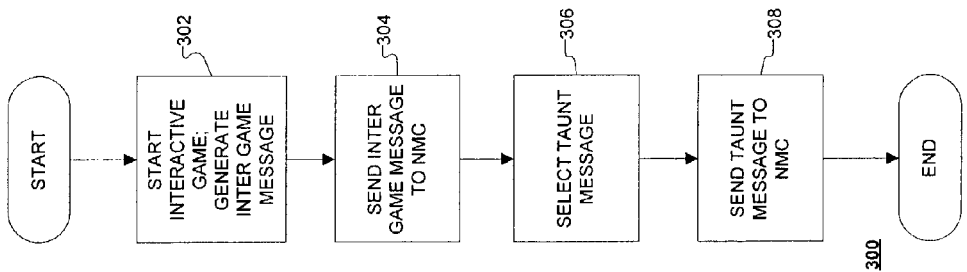

Thus, the NMC or hub 10 may store data related to wireless device transactions for many different receiving devices. FIGS. 6A to 6C are flow diagrams of exemplary methods 230, 240, and 250 for sending a short message to at least one wireless device according to an embodiment of the present invention. An electronic device may perform the process 230 to send a short message ("SM") to one or more destination wireless devices. The process 230 generates a SM message request (step 232). The message request may include the short message and a list of destination wireless device identifiers. In another embodiment the identifier list may include a destination group identifier where the destination group identifier represents two or more destination wireless device identifiers. The sending electronic device application performing process 230 sends the SM request to the NMC or hub 10 via its wireless service provider 32, 34.

The NMC performs process 240 upon receipt of a SM request (step 242). The process 240 converts destination group identifiers in the SM request to the destination wireless device identifiers represented by the destination group identifiers (steps 244, 246). The NMC or hub 10 then transmits the SM to each destination/identified wireless device 248 (using SMS GW 122, 124, routers 142, 144, and firewalls 152, 154). Again, the NMC may format the SM for each identified/destination wireless device based on knowledge of its operating system or wireless system provider. For example when a destination wireless device has a BREW operating system, the SM message may have the format:

//BREW:classid:SM.

The classid may be a BREW application designed to display a SM upon receipt.

Process 250 may be performed by a destination wireless device application upon receipt of the SM message from the NMC or hub 10 (step 252). The process invokes the application that handles the message. For destination devices having a BREW operating system the message may include an application identifier (classid) to be invoked (step 254). The application may be a wake up program that wakes the device and informs the user that a message has arrived (via a display or tone in one example). The application may then display the SM (step 256).

FIGS. 7A to 7D are flow diagrams of exemplary methods for maintaining and communicating an electronic device game score database according to an embodiment of the present invention. Electronic devices may execute application that represents a game to be played by the device user. The NMC or hub 10 may be used to track game application usage and scoring using processes 260, 270, 280, and 290. An electronic device application may execute process 260 after a gaming application had ended (or as part of the ending sequences of the gaming application.) In one embodiment the electronic device includes wireless communication elements. At step 262 when a game finishes, a score message is generated. Then score message may include a user identifier, electronic device identifier, score, application identifier, date, time game started, and time game ended. The application may direct the electronic device to transmit the score message to the NMC or hub 10 (step 264). The application may receive a high score message from the NMC or hub (step 266) via the electronic device. The high score message may include the current highest scores (one to any predetermined number (for example top ten)) for the application along with user identifiers associated with the highest scores. The application may then direct the electronic device to display the highest scores and associated user identifiers at step 268.

The NMC or hub 10 may execute the process 270 to process score messages and maintain score databases for gaming applications. At step 272, the NMC or hub 10 receives a score message. The NMC or hub 10 updates a score database based on the score message (step 274). The score database may be maintained by database servers 132, 134. The score database may include the user identifier, electronic device identifier, score, application identifier, date, time game started, and time game ended. The process 270 may then generate a high score message that includes a highest scores list with associated user identifiers (at step 276) and direct the NMC or hub 10 to transmit the high score message to the electronic device using a SMS format (at step 278).

Score database information maintained by the NMC 10 may be requested by game developers or companies tracking this information for contests or other purposes. A game developer or company via an electronic device capable of coupling with the NMC or hub 10 may perform process 280 to receive gaming statistics/information. The process 280 generates a game fact request message 282 where the message includes parameters indicating the statistics/information desired for one or more records in score databases (step 282). The requesting electronic device sends the game fact request message to the NMC or hub 10 (step 284). The requesting electronic device may then receive a game facts message from the NMC or hub 10 including the requested score database statistics/information (step 286).

Process 290 may be executed by the NMC or hub 10 to process a game fact request message from an electronic device (step 292). The NMC or hub 10 may retrieve one or more score database records from the database servers 132, 134 based on the game information requested (in the game fact request message) (step 294). The NMC or hub 10 may then generate a game facts message including the requested game information (step 296) and forward the game facts message to the requester (requesting electronic device) (step 298).

The NMC or HUB 10 may also track real time application usage and enable electronic device application users to interact on a real time basis. FIGS. 8A to 8D are flow diagrams of exemplary methods 300, 310, 320, and 330 for an electronic device application user to send messages to other users contemporaneously executing a similar application on an electronic device according to an embodiment of the present invention. In one exemplary embodiment the application (being executed by users on an electronic device) is a gaming application. Process 300 may be executed by an electronic device executing a gaming application. When a user of the electronic device directs the device to start of an interactive game application, the electronic device may invoke process 300 which generate an inter-game message (step 302). The inter-game message may include an application identifier, current score, electronic device identifier, and user identifier. The process 300 may direct the electronic device to transmit the inter-game message to the NMC or hub 10 (step 304). In one exemplary embodiment the electronic device is a wireless device and the inter-game message is directed to the NMC or hub 10 via the wireless device's service provider 32, 34. The electronic device user may then select or create a message (via an application) to be sent to other users executing a similar game application on electronic devices (step 306). The message may include the application identifier, current score, user identifier, and a message or message identifier (step 308). In one embodiment, the message may be a taunt message.

The NMC or hub may invoke method 310 to process inter-game messages. The NMC or hub 10 may receive an inter-game message at step 312 (from an electronic device). The NMC or hub 10 may use the data in the message to update or maintain an inter-game database that indicates users concurrently executing a particular application via an electronic device (step 314). The method 310 invoked by the NMC or hub 10 may also update/maintain the inter-game database upon receipt of a score message. In particular the method 310 may remove a user from the inter-game database indicating current game participants (of a gaming application on an electronic device) upon receipt of a score message (indicating the gaming application on the electronic device is ending).

The NMC or hub 10 may invoke method 320 to process taunt messages from electronic devices. When the method 320 receives a taunt message (step 322), it may uses the application identifier (in the message) and inter-game database of the NMC or hub 10 to generate a list of other users concurrently executing the identified application on an electronic device (step 324). Then method 320 may direct the NMC or hub 10 generate and transmit a SMS message including the taunt message for each user in the list. The SMS message may include the taunt message and taunt message creator identifier (user identifier for electronic device that generated the taunt message). The method 320 may vary the SMS message format based on the destination electronic device. An electronic device may invoke method 330 upon receipt of a SMS taunt message (step 332). The method 330 may direct the electronic device to display the taunt message (and taunt message creator user identifier) (step 334).

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware (e.g., a software language other than Java, such as C++ or others may be used to implement the invention). As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

The principles described herein can be applied in many different environments with a variety of results. For example, the invention may be used as a system that supports short message service ("SMS") messaging to communicate with devices that have BREW operating systems. The invention may also be used to facilitate the automatic retrieval of data files with the receiving devices' user intervention. Otherwise (without the present invention) when one wireless user sends a data file to another receiving device, the receiving device's user would need to log into a secure server to affect the data file download. With the minor addition of a simple application (to enable communication with the NMC or hub 10), a receiving device of the present invention may facilitate automatic data retrieval (little or no user intervention). In addition, the present invention may affect a data file transfer to multiple recipients without requiring a transmitting wireless device to create an individual message for each receiving device.

What is claimed is:

1. A method of enabling a user executing a game application on a first wireless device to send messages to another user contemporaneously playing the same game application on another wireless device, comprising the steps of:
   a) receiving a Short Message Service ("SMS") start game message from the first wireless device at a communications hub, the message including an identifier corresponding to the game application and an identifier corresponding to the first wireless device;
   b) storing the first wireless device identifier in a database at the communications hub based on the game application identifier;
   c) receiving a SMS start game message from the another wireless device at the communications hub, the message including an identifier corresponding to the game application and an identifier corresponding to the another wireless device;
   d) storing the another wireless device identifier in the database at the communications hub based on the game application identifier;
   e) receiving a SMS send gamers message from the first wireless device at the communications hub, the SMS send gamers message including a taunt message and the first wireless device identifier;
   f) determining the another wireless device playing the game application corresponding to the first wireless device identifier based on the game application identifier and the stored wireless device identifiers in the database;
   g) generating a gamers taunt message including the taunt message;
   h) sending the gamers taunt message to the another wireless device determined to be playing the game application.

2. The method of claim 1, wherein the gamers taunt message includes a user identifier corresponding to the first wireless device.

3. The method of claim 1, wherein the taunt message is a SMS message.

4. The method of claim 1, further comprising the steps of:
   i) receiving a SMS high score message from a wireless device, the message including the game application identifier corresponding to the game and a wireless device identifier corresponding to the wireless device; and
   j) removing the wireless device identifier from the database based on the game application identifier.

5. The method of claim 1, wherein the first wireless device is a cellular phone.

6. The method of claim 1, wherein the first wireless device has a BREW operating system.

7. A system for enabling a user executing a game application on a first wireless device to send messages to another user contemporaneously playing the same game application on another wireless device, comprising:
  a) means for receiving a Short Message Service ("SMS") start game message from the first wireless device at a communications hub, the message including an identifier corresponding to the game application and an identifier corresponding to the first wireless device;
  b) means for storing the first wireless device identifier in a database at the communications hub based on the game application identifier;
  c) means for receiving a SMS start game message from the another wireless device at the communications hub, the message including an identifier corresponding to the game application and an identifier corresponding to the another wireless device;
  d) means for storing the another wireless device identifier in the database at the communications hub based on the game application identifier;
  e) means for receiving a SMS send gamers message from the first wireless device at the communications hub, the SMS send gamers message including taunt message and the first wireless device identifier;
  f) means for determining the another wireless device playing the game application corresponding to the first wireless device identifier based on the game application identifier and the stored wireless device identifiers in the database;
  g) means for generating a gamers taunt message including the taunt message;
  h) means for sending the gamers taunt message to the another wireless device determined to be playing the game application.

8. The system of claim 7, wherein the garners taunt message includes a user identifier corresponding to the first wireless device.

9. The system of claim 8, wherein the taunt message is a SMS message.

10. The system of claim 7, further comprising:
  i) means for receiving a SMS high score message from a wireless device, the message including the game application identifier corresponding to the game and a wireless device identifier corresponding to the wireless device; and
  j) means for removing the wireless device identifier from the database based on the game application identifier.

11. The system of claim 7, wherein the first wireless device is a cellular phone.

12. The system of claim 7, wherein the first wireless device has a BREW operating system.

* * * * *